(12) United States Patent
Ido

(10) Patent No.: US 6,357,392 B1
(45) Date of Patent: Mar. 19, 2002

(54) APPARATUS AND METHOD FOR RAISING FISH AND/OR SHELLFISH

(75) Inventor: Katsutomi Ido, Gifu-ken (JP)

(73) Assignee: Electron Property Research Institute Co., LTD (JP)

(*) Notice: Subject to any disclaimer, the term of this patent is extended or adjusted under 35 U.S.C. 154(b) by 0 days.

(21) Appl. No.: 09/623,075
(22) PCT Filed: Dec. 27, 1999
(86) PCT No.: PCT/JP99/07317
  § 371 Date: Sep. 25, 2000
  § 102(e) Date: Sep. 25, 2000
(87) PCT Pub. No.: WO00/40081
  PCT Pub. Date: Jul. 13, 2000

(30) Foreign Application Priority Data

Dec. 28, 1998 (JP) ............................. 10-273621
Dec. 24, 1999 (JP) ............................. 11-368011

(51) Int. Cl.[7] ........................................ A01K 63/00
(52) U.S. Cl. ...................... 119/252; 119/260; 119/248
(58) Field of Search ................. 119/215, 242, 119/243, 244, 234, 248, 252, 260, 261, 267; 210/189

(56) References Cited

U.S. PATENT DOCUMENTS 5,081,954 A * 1/1992 Monus ..................... 119/260
5,560,318 A * 10/1996 Yoshida et al. ............. 119/248
5,692,455 A * 12/1997 Wang ......................... 119/234
5,707,514 A * 1/1998 Yamasaki et al. .......... 210/189
5,961,831 A * 10/1999 Lee et al. .................... 119/260
6,117,313 A * 9/2000 Goldman et al. .......... 119/260
6,158,386 A * 12/2000 Limcaco .................... 119/248

FOREIGN PATENT DOCUMENTS

| JP | 4258236 | 9/1992 |
| JP | 6-46458 | 6/1994 |
| JP | 8056523 | 3/1996 |
| JP | 8140588 | 6/1996 |
| JP | 9172901 | 7/1997 |
| JP | 11056162 | 3/1999 |

* cited by examiner

Primary Examiner—Charles T. Jordan
Assistant Examiner—Elizabeth Shaw
(74) Attorney, Agent, or Firm—Madson & Metcalf

(57) ABSTRACT

A stable apparatus and method for raising fish and/or shellfish. An aquarium (12) contains pearl oysters and breeding water. A decomposition treating bath (19) is supplied with water from the breeding aquarium for decomposing excretion of the pearl oysters produced in the breeding aquarium. As a result, purified decomposition-treated water is produced in the decomposition treating bath. A feed culture bath (23) cultures a feed liquid for the pearl oysters. The feed culture bath is supplied with the decomposition-treated water. A fluorescent lamp (24) illuminates the feed culture bath.

25 Claims, 7 Drawing Sheets

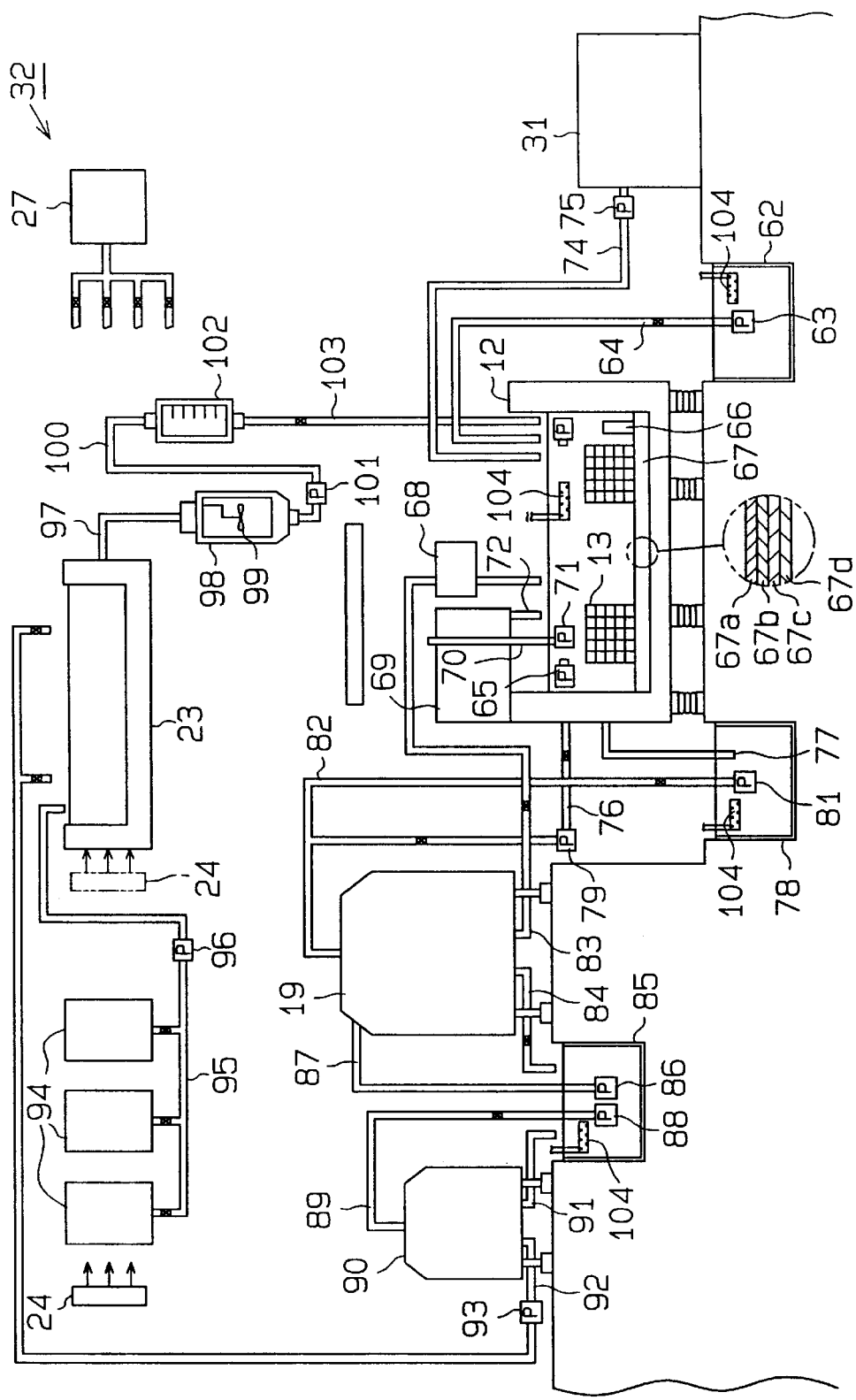

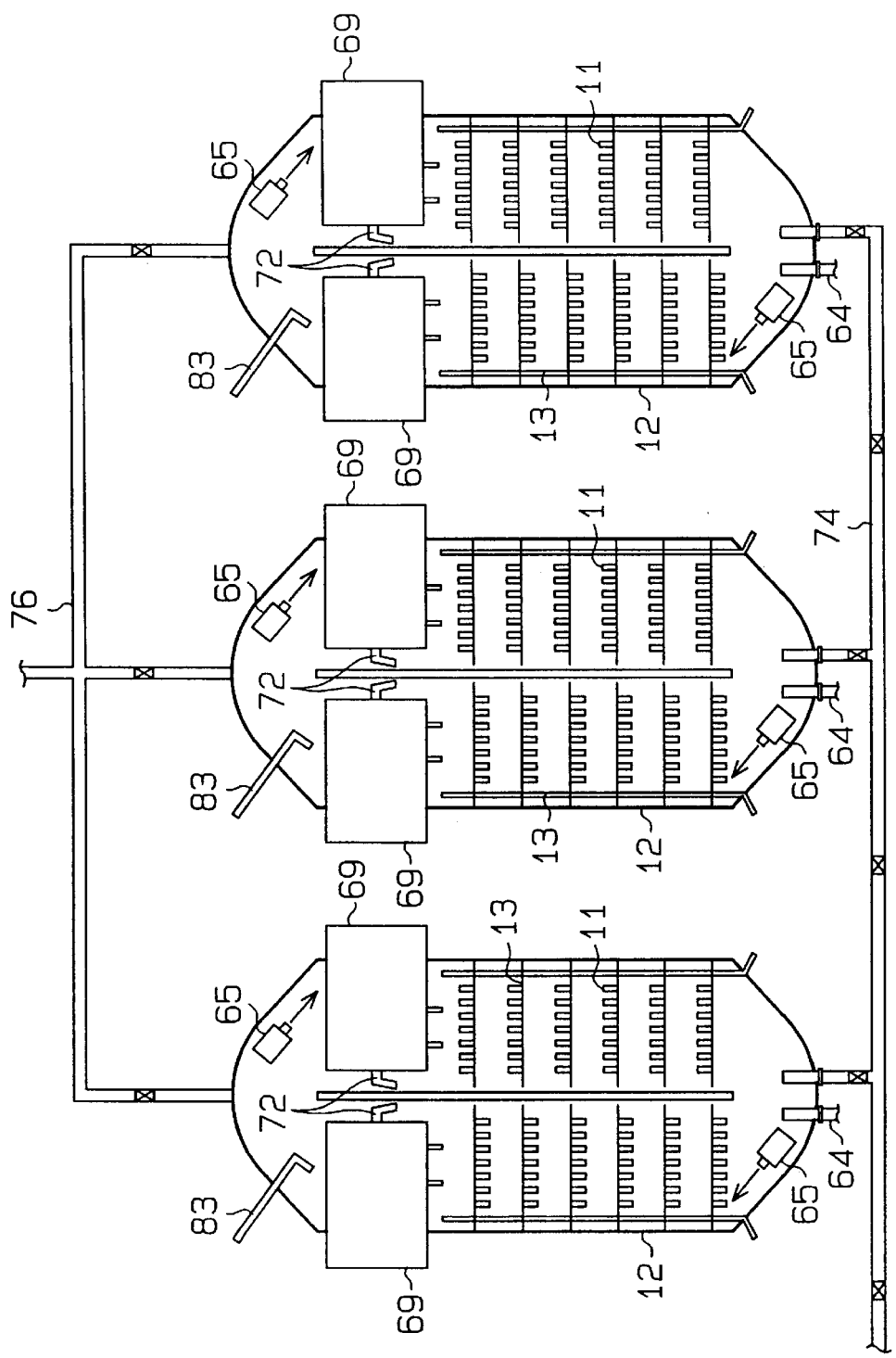

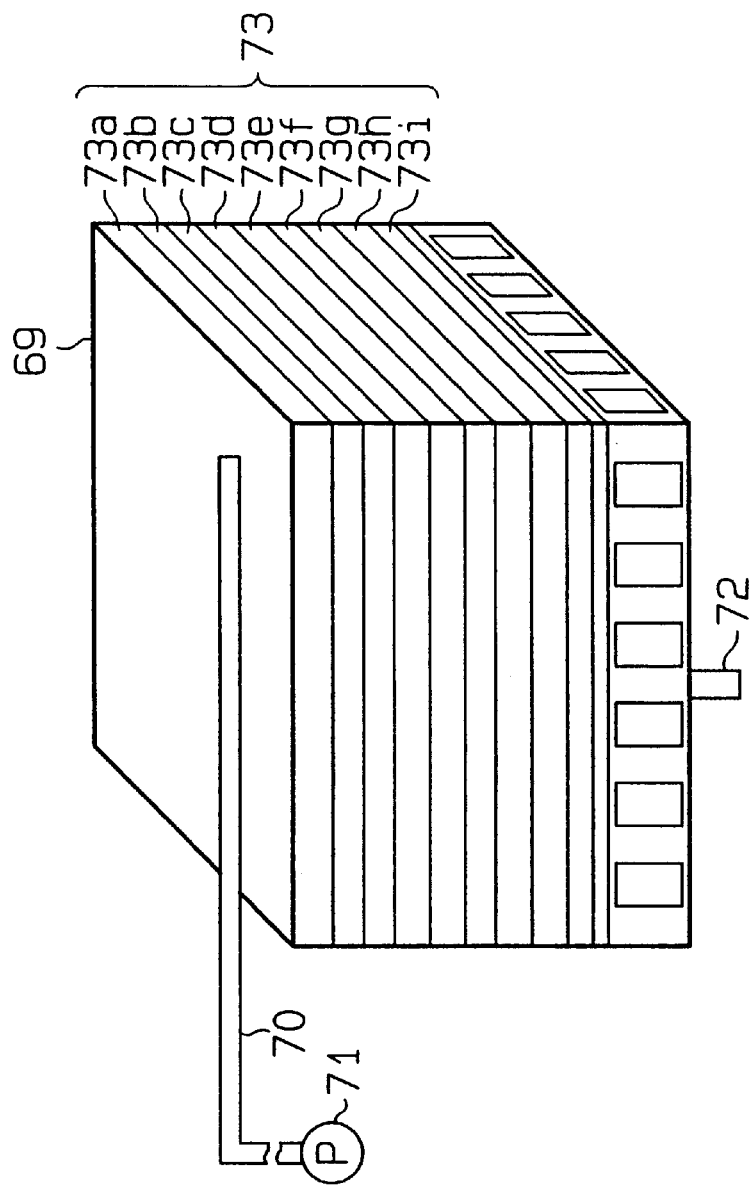

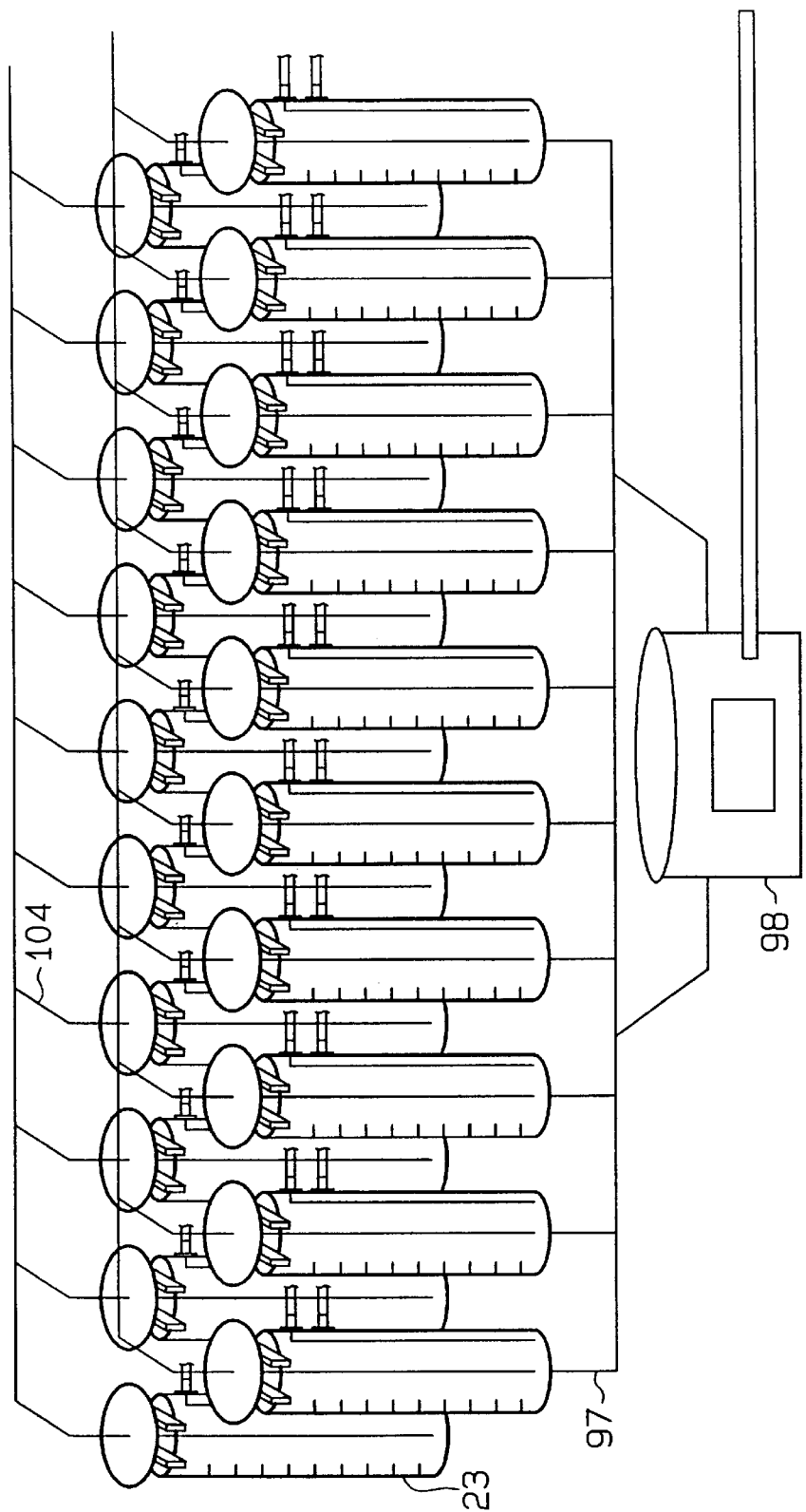

APPARATUS AND METHOD FOR RAISING FISH AND/OR SHELLFISH

BACKGROUND OF THE INVENTION

The present invention relates to a fish and/or shellfish breeding apparatus for feeding fish and/or shellfish such as pearl oysters on land.

In pearl culture, one type of aquaculture, young pearl oysters are bred for a fixed period of time to be raised to mother pearl oysters. Then, a core is transplanted to the interior of each mother oyster for forming a pearl. While the mother oysters are raised in the sea for a fixed period of time, pearl oysters transform the cores into pearls. Then, the pearls are extracted from the interior of the mother oyster.

For breeding young pearl oysters for two to three months of development before the transplantation of cores, the young oysters are put into an aquarium filled with sterilized seawater. In addition, the aquarium is supplied with separately cultured plankton as food for the young shellfish. The seawater becomes dirty with unconsumed feed and excretion of the young shellfish during the culture. The dirty seawater is periodically replaced with sterilized seawater. Since the seawater replacement is performed on a periodic basis and on a large scale, it is laborious.

In the field of pearl culture, a large amount of pearl oysters have died in course of culture in recent years due to a variety of oceanic environment-based causes such as oceanic contamination, seawater warming, and parasitic protozoan or viruses. This large amount of dead pearl oysters sharply reduced in the yield of pearl oysters and pearls. Thus, recently, stable aquaculture has become increasingly difficult in the sea.

SUMMARY OF THE INVENTION

It is an object of the invention to provide a stable fish and/or shellfish breeding apparatus and method.

To achieve the above object, the invention includes a method and an apparatus. The apparatus includes an aquarium for containing the fish or shellfish and water and a decomposition treating bath for decomposing waste materials from the fish or shellfish such that water from the aquarium flows to the decomposition treating bath, and the decomposition treating bath treats the water. The apparatus also includes a feed culture bath for culturing feed for the fish or shellfish. Treated water from the decomposition bath is supplied to the feed culture bath.

The method includes providing an aquarium for containing the fish or shellfish and water, providing a decomposition treating bath, and conveying the water from the aquarium to the decomposition treating bath. The decomposition treating bath treats the water from the aquarium. The method also includes providing a feed culture bath for culturing feed for the fish or shellfish and conveying water from the decomposition treating bath to the feed culture bath. The method also includes supplying water that includes feed from the feed culture bath to the aquarium.

BRIEF DESCRIPTION OF THE DRAWINGS

FIG. 5 is a diagram schematically illustrating a fish and/or shellfish breeding apparatus according to a second embodiment of the present invention;

FIG. 6 is a top plan view schematically illustrating a breeding aquarium in the breeding apparatus of FIG. 5;

FIG. 7 is a perspective view schematically illustrating a filter material for the breeding apparatus of FIG. 5; and FIG. 8 is a perspective view schematically illustrating a feed culture bath in the breeding apparatus of FIG. 5.

DETAILED DESCRIPTION OF THE PREFERRED EMBODIMENTS

Pearl oysters 11 belong to Bivalvia and are used as mother shellfish for cultured pearls. When a core is transplanted to the interior of a pearl oyster 11, a pearl layer is formed on the surface of the core by mother-of-pearl secreted from the interior, and as a result, a pearl is produced.

Next, a fish and/or shellfish breeding apparatus will be described.

Figure 1:
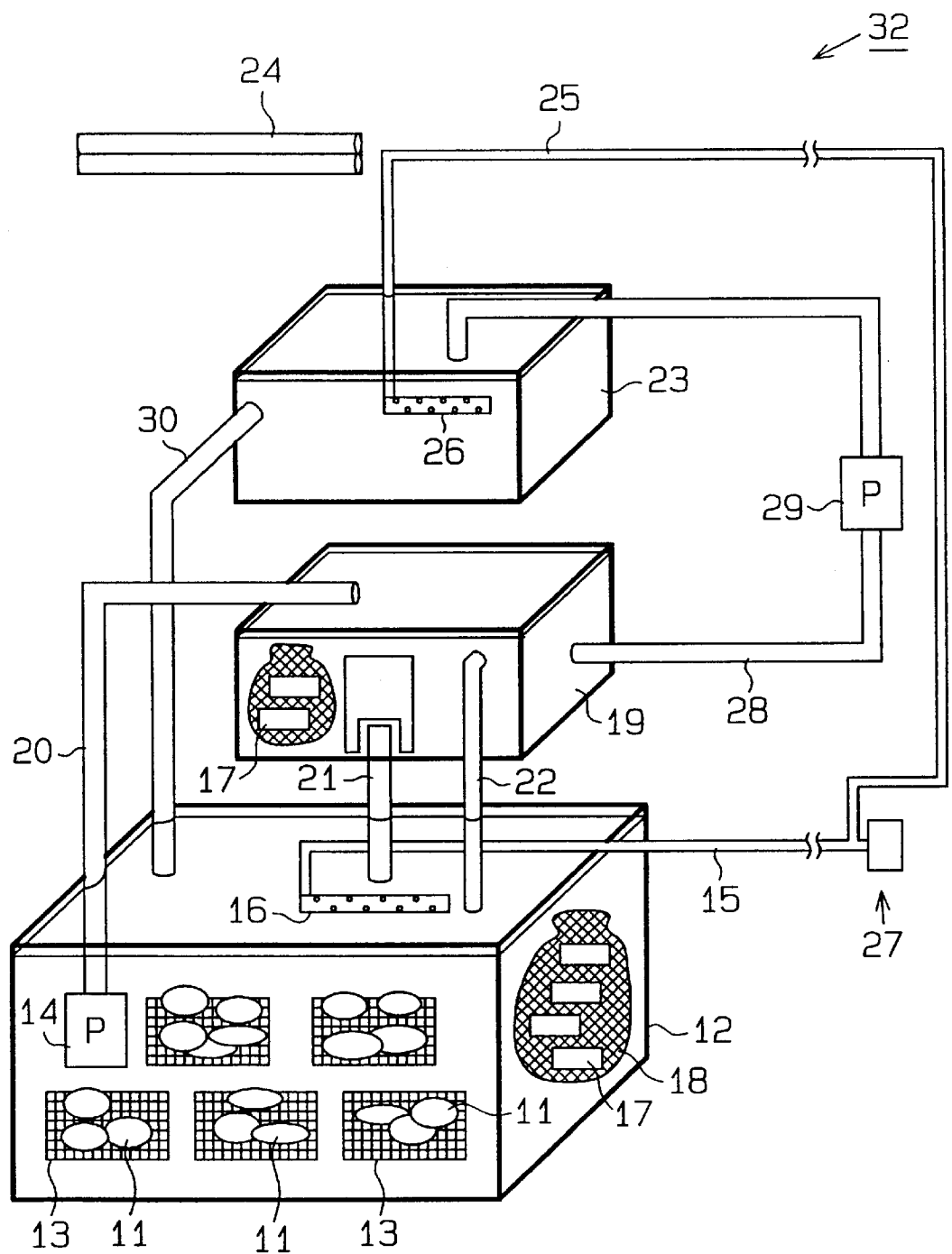
FIG. 1 is a diagram schematically illustrating a fish and/or shellfish breeding apparatus according to a first embodiment of the present invention.

As illustrated in FIG. 1, a breeding aquarium 12 is formed of a synthetic resin material, glass, or the like into a box having an opening on the top. The aquarium 12 contains fifty to one hundred liters of breeding seawater. A plurality of cages 13, in which a plurality of pearl oysters 11 are contained, are placed in the breeding aquarium 12. The pearl oysters 11 are bred or cultured in the breeding aquarium 12.

The amounts of the breeding seawater and the pearl oysters 11 are adjusted such that approximately one and one half to three liters of breeding seawater are provided for each pearl oyster 11. A first pump 14 is located in the breeding aquarium 12 for pumping the breeding seawater in the breeding aquarium 12. Calcium, iron and zinc are added to the breeding aquarium 12 as minerals required for raising the pearl oysters 11. These minerals are added such that their dissolved proportions to the breeding seawater are in a range of 400 to 450 ppm for calcium; 0.1 to 5 ppm for iron; and 0.5 to 5 ppm for zinc, in order to ensure that the pearl oysters 11 mature.

A first aerator 16 is located in the breeding aquarium 12. The first aerator 16 is connected to an electrostatically treated air generator 27 through a first air supply pipe 15. The electrostatically treated air generator 27 generates electrostatically treated air (electrostatic air), which is delivered from the first aerator 16 into the breeding aquarium 12. Thus, the breeding seawater in the breeding aquarium 12 is aerated by the electrostatically treated air generator 27.

Activated charcoal 17 packed in a net 18 is located in the breeding aquarium 12. The activated charcoal 17 has a deodorizing function, a purifying function, and an oxidation suppressing function. The activated charcoal 17 is porous, and microorganisms such as nitrifying bacteria, inhabit within its holes. The bacteria biologically decompose contaminated substances or the like in the breeding seawater. Therefore, the breeding seawater in the breeding aquarium 12 is maintained in a stable clean state. As the activated charcoal 17, binchotan charcoal is particularly preferred.

A biological decomposition bath 19 is formed of a synthetic resin material, glass, or the like and has a top opening. The biological decomposition bath 19 is supplied with the breeding seawater from the breeding aquarium 12. Nitrifying bacteria, such as nitrate bacteria and nitrite bacteria, inhabit the biological decomposition bath 19. The bacteria biologically decompose ammonia, which is included in the excretion of the pearl oysters 11 and other waste products in the breeding seawater, to nitrate salt, so that decomposition-treated seawater is produced from the breeding seawater. The contamination level and turbidity of the decomposition-treated seawater are reduced.

Activated charcoal 17 packed in a net 18 is located in the biological decomposition bath 19. The activated charcoal 17 has a deodorizing functions, a purifying functions, and an oxidation suppressing functions. Also, since useful microorganisms inhabit the activated charcoal 17, they biologically decompose contaminated substances and so on in the breeding seawater. Thus, the breeding seawater in the breeding aquarium 12 is maintained in a stable clean state. As the activated charcoal 17, binchotan charcoal is particularly preferred.

The biological decomposition bath 19 and the breeding aquarium 12 are coupled by way of a first circulation pipe 20, a second circulation pipe 21 and a third circulation pipe 22. The first circulation pipe 20 has one end connected to the first pump 14 in the breeding aquarium 12, and the other end directed into the biological decomposition bath 19 from the opening of the biological decomposition bath 19. Then, the breeding seawater in the breeding aquarium 12 is pumped by the first pump 14, passed through the first circulation pipe 20, and supplied to the biological decomposition bath 19.

Each of the second circulation pipe 21 and the third circulation pipe 22 has one end connected to the biological decomposition bath 19 and the other end directed into the breeding aquarium 12 from the opening of the breeding aquarium 12. Decomposition-treated seawater, which has been purified by the biological decomposition within the biological decomposition bath 19, is returned to the breeding aquarium 12.

A feed culture bath 23 is formed of a synthetic resin material, glass, or the like and has an upper opening. The feed culture bath 23 is supplied with a feed liquid and some of the decomposition-treated seawater. In the feed liquid, phytoplankton lives and serves as food for the pearl oysters 11. The phytoplankton includes chaetoceros and pavlova. The chaetoceros and pavlova use nitrates produced by biological decomposition and included in the decomposition-treated seawater as a nutrient for growth and proliferation.

Before being injected into the feed culture bath 23, the chaetoceros and pavlova are subjected to stock culture, intermediate culture and massive culture in this order until a predetermined culture concentration is achieved. The stock culture is a subculture, performed for one to two weeks, for preserving seeds of chaetoceros and pavlova little by little in order to prevent them from being exhausted. The intermediate culture, which is performed to slightly increase the culture concentration of the chaetoceros and pavlova proliferated by the stock culture within a culture solution, is carried out until the culture concentration reaches 5,000,000 to 10,000,000 cells/ml.

In the stock culture and intermediate culture, the culture solution for culturing the chaetoceros and pavlova is prepared by adding nutritive salts to artificial seawater. Components of the nutritive salts include sodium nitrate, disodium hydrogenphosphate, water glass, sodium hydrogencarbonate, ethylenediamine, vitamins (thiamine hydrochloride, vitamin B12, biotin). A product named Kurewatto-32 manufactured by Teikoku Kagaku Sangyo Kabushiki Kaisha may be used to provide the nutritive salts. The culture solution is prepared by combining the components appropriated in accordance with the stock culture and the intermediate culture.

In this case, electrostatically treated air is aerated into the culture solution for the chaetoceros and pavlova during the intermediate culture. This increases the rate at which the chaetoceros and pavlova are cultured and stabilizes the culture.

The massive culture is performed to culture the feed liquid for the pearl oysters 11 and is carried out until the culture concentration reaches 3,000,000 cells/ml. In this event, electrostatically treated air is aerated into the culture solution for the chaetoceros and pavlova. This increases the rate at which the chaetoceros and pavlova are cultured and stabilizes the culture. Then, feed liquid that has been cultured to a predetermined culture concentration by the massive culture is injected into the feed culture bath 23.

Above the feed culture bath 23, a fluorescent lamp 24 is located for irradiating the feed culture bath 23 with light. Thus, with light irradiated from the fluorescent lamp 24, the chaetoceros and pavlova can carry out photosynthesis. The phytoplankton can grow and proliferate with nitrate and photosynthesis. A mixed feed of chaetoceros and pavlova in liquid form is suitable for the culture of the pearl oysters 11.

A second aerator 26, which is connected to one end of the second air supply pipe 25, is placed in the feed culture bath 23, and the second air supply pipe 25 is connected to the electrostatically treated air generator 27. Then, electrostatically treated air generated by the electrostatically treated air generator 27 is delivered F. from the second aerator 26 into the feed culture bath 23, so that the feed liquid within the feed culture bath 23 can be aerated.

The feed culture bath 23 and the biological decomposition bath 19 are coupled through a fourth circulation pipe 28. One end of the fourth circulation pipe 28 is inserted into the feed culture bath 23 through the upper opening, and the other end of the fourth circulation pipe 28, through a second pump 29, is inserted into the biological decomposition bath 19. Then, with the second pump 29, some of the decomposition-treated seawater produced by the biological decomposition within the biological decomposition bath 19 is pumped and supplied into the feed culture bath 23.

The feed culture bath 23 and the breeding aquarium 12 are coupled through a fifth circulation pipe 30. One end of the fifth circulation pipe 30 is connected to the side of the feed culture bath 23, and the other end of the fifth circulation pipe 30 is inserted into the breeding aquarium 12 through the upper opening of the breeding aquarium 12. The feed liquid, which contains phytoplankton cultured and proliferated in the feed culture bath 23, is supplied to the breeding aquarium 12. Thus, the pearl oysters 11 in the breeding aquarium 12 can grow, and the phytoplankton within the feed liquid is used as food.

While the breeding seawater, the feed liquid, and some of the decomposition-treated seawater are circulated into the breeding aquarium 12, approximately one liter of water in the breeding aquarium 12 evaporates per day. For this reason, electrostatic field treated water, which is produced by the electrostatic water producing apparatus 31 (electrostatic water), is added to maintain the concentrations of components and the amount of water in the breeding aquarium 12 constant.

Thus, the fish and/or shellfish breeding apparatus 32 includes the breeding aquarium 12, the biological decomposition bath 19, the feed culture bath 23, and the fluorescent lamp 24.

Next, the electrostatically treated air generator 27 will be described.

Figure 2:
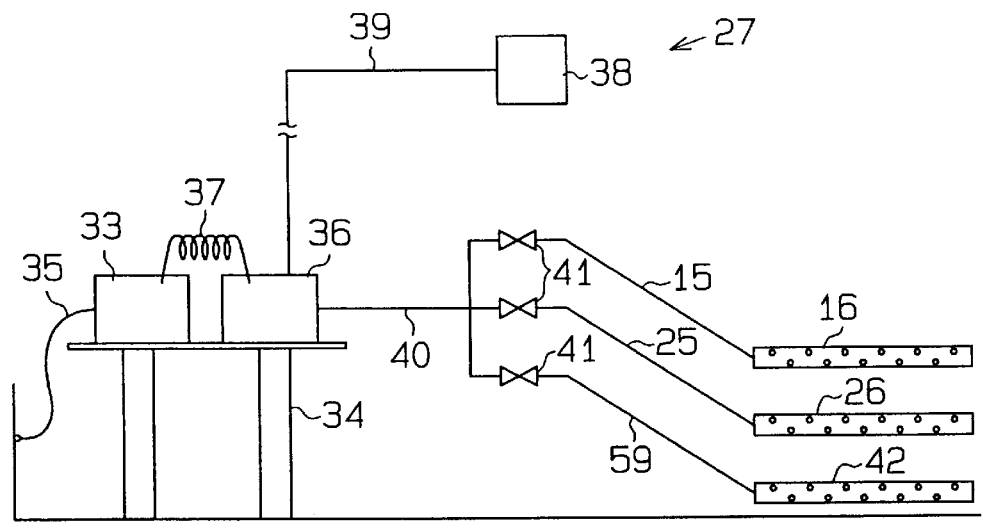
FIG. 2 is a diagram schematically illustrating an electrostatically treated air generator in the breeding apparatus of FIG. 1.

As illustrated in FIG. 2, the electrostatically treated air generator 27 includes a high voltage electrostatic field generator 33. The high voltage electrostatic field generator 33, which is in the shape of box, is carried on a support base 34 positioned near the breeding apparatus 32. The high voltage electrostatic field generator 33 is connected to a power supply, not shown, through a first connection line 35. A generator 36 is carried on the support base 34 and positioned near the high voltage electrostatic field generator 33. The generator 36 is connected to the high voltage electrostatic generator 33 through a second connection line 37.

A fan 38 is located near the generator 36. Air forced by the fan 38 is delivered to the generator 36 through a first air feed pipe 39. Then, the air within the generator 36 is exposed to an electrostatic field formed by the high voltage electrostatic field generator 33 for performing an electrostatic field treatment.

One end of a second air feed pipe 40 is connected to the generator 36, and the other end is branched into a plurality of pipes, each of which has an air branch adjusting valve 41 connected thereto. The air branch adjusting valves 41 are connected to one end of first to third air supply pipes 15, 25, 59, respectively, and the other ends are connected to first to third aerators 16, 26, 42, respectively. Electrostatically treated air generated by the generator 36 is delivered into the second air feed pipe 40, and the air branch adjusting valves 41 are opened, so that the electrostatically treated air is discharged from the first to third aerators 16, 26, 42 through the respective air supply pipes 15, 25, 59.

Next, the electrostatically treated water producing apparatus 31 will be described.

Figure 3:
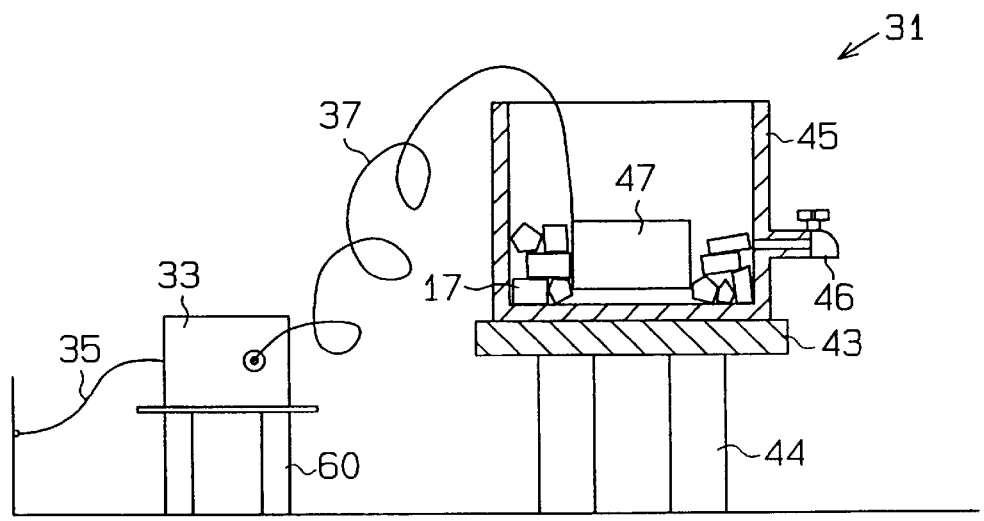
FIG. 3 is a diagram schematically illustrating an electrostatically treated water producing apparatus in the breeding apparatus of FIG. 1.

As illustrated in FIG. 3, an insulating base 43 is formed of an electrically insulating material in the shape of a plate, and supported by several columnar insulators 44. A tank 45 formed of polypropylene resin or the like is carried on the insulating base 43. The tank 45 is provided with a discharge port 46 on one side surface, so that electrostatically treated water in the tank 45 can be discharged.

A high voltage electrostatic field generator 33 constituting the electrostatically treated water producing apparatus 31, which is formed in the shape of box, is carried on a carrier base 60 positioned near the breeding apparatus 32. Then, the high voltage electrostatic field generator 33 is connected to a power supply, not shown, through a first connection line 35.

One end of the second connection line 37 is connected to an electrode 47, which is formed of stainless steel or the like and has the shape of screen, and the other end of the second connection line 37 is connected to the high voltage electrostatic field generator 33. The tank 45 contains activated charcoal 17, water, and the electrode 47. An electrostatic field formed by the high voltage electrostatic field generator 33 is applied to the water. As a result, electrostatically treated water is produced. The activated charcoal 17, in turn, has a deodorizing functions, a purifying functions, an oxidation suppressing functions, and so on, so that the electrostatically treated water in the tank 45 is maintained in a stable and clean state.

Next, an electric circuit of the high voltage electrostatic field generator 33 will be described.

Figure 4:
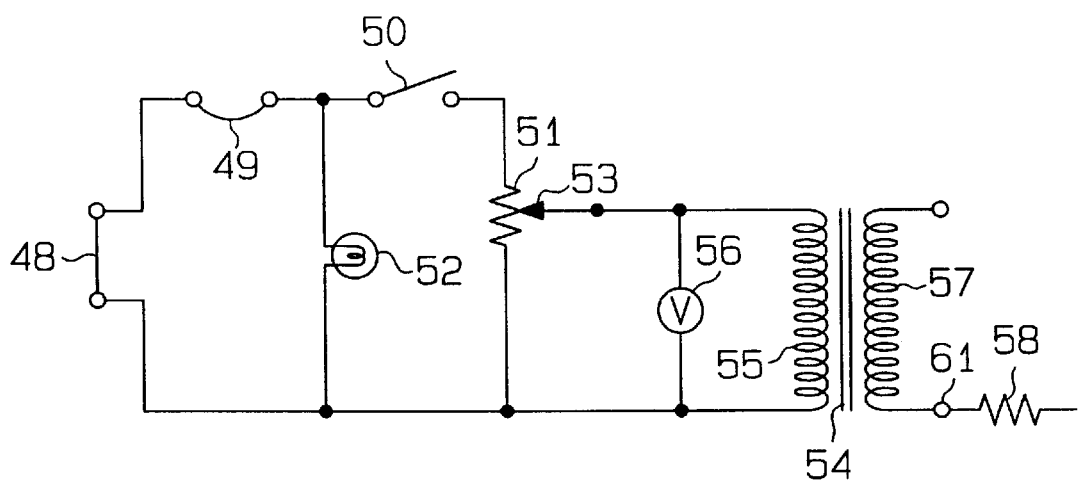
FIG. 4 is an electric circuit diagram of a high voltage electrostatic field generator in the breeding apparatus of FIG. 1.

As illustrated in FIG. 4, a 100V alternating current power supply terminal 48 is serially connected to a breaker 49, a power supply switch 50 and a voltage adjuster 51. An indicator lamp 52 is connected in parallel with the voltage adjuster 51. The voltage adjuster 51 is capable of adjusting a voltage through a variable terminal 53. A primary coil 55 of a high voltage generating transformer 54 is connected in parallel with the voltage adjuster 51. A volt meter 56 is connected in parallel with the primary coil 55 of the high voltage generating transformer 54. One end of a secondary coil 57 of the high voltage generating transformer 54 is left open, while an output terminal 61 on the other end is connected to a protection resistor 58 of approximately 1 MΩ. The second connection line 37 is connected through this protection resistor 58 to the generator 36 or the electrode 47.

As described above, one end of the secondary coil 57 of the high voltage generating transformer 54, on the output side, is left open. Therefore, no power flows to the output side of the secondary coil 57 of the high voltage generating transformer 54, so that high voltage is only applied to form a high voltage electrostatic field having multiplexed waveforms including harmonic components.

Then, after the variable terminal 53 is set at a predetermined resistance in the voltage adjuster 51, the power switch 50 is turned on to light the indicator lamp 52 and generate a high voltage on the output side of the secondary coil 57 of the high voltage generating transformer 54. A high voltage electrostatic field is formed in the generator 36 or the tank 45 by this high voltage.

The electrostatic field is a non-varying electrostatic field or a varying electrostatic field generated by the high voltage electrostatic field generator 33. The non-varying electrostatic field is an electric field having a linear waveform generated by a fixed voltage, while the varying electrostatic field is an electrostatic field having an alternating current waveform such as a sinusoidal wave, a rectangular wave, a saw-tooth wave, a multiplexed waveform, or the like. Among these electrostatic fields, an electric field having a multiplexed waveform having high harmonic components is preferred. The electric field having a multiplexed waveform can be produced by an electric circuit using semiconductors or the like, in addition to the aforementioned electric circuit having the high voltage generating transformer 54.

The electrostatic field having a multiplexed waveform including high harmonic components is produced by an electric circuit that includes a high voltage and high harmonic generating transformer in the electric circuit. The multiplexed waveform is produced by combining sinusoidal waves or the like of various wavelengths in a multiplexing manner. A variety of high harmonic alternating current waveforms having suitable wavelengths are added with their phases shifted, and their waveforms are added to form distortion on an alternating current waveform.

For performing the electrostatic field treatment, the electrostatic field is preferably set at a voltage ranging from 1500 to 5000 volts. When the voltage is lower than 1500 volts, more time is consumed for the electrostatic field treatment, thus causing an increase in breeding cost. In addition, the electrostatic field treatment is not sufficient, thereby failing to improve the function of the resulting electrostatically treated air or electrostatically treated water. On the other hand, when the voltage exceeds 5000 volts, the electrostatically treated air or electrostatically treated water will be excessively treated in part.

The electrostatic field treating time is preferably set in a range of 4 to 300 hours, and more preferably set in a range of 48 to 300 hours.

Next, a method of breeding the pearl oysters 11 using the breeding apparatus 32, i.e., a culturing method will be described.

First, a plurality of cages 13, in which a plurality of mother pearl oysters 11 are contained, are placed in the breeding aquarium 12, which is filled with breeding seawater. In this event, the number of pearl oysters 11 and the breeding seawater are adjusted such that one and one half to three liters of the breeding seawater corresponds to one pearl oyster 11. Also, the water temperature in the breeding aquarium 12 is set in a range of 13 to 25° C. A spherical core is transplanted to the interior of each pearl oyster 11.

Further, the high voltage electrostatic field generator 33 of the electrostatically treated air generator 37 is operated to generate electrostatically treated air which has undergone the electrostatic field treatment. Then, the electrostatically treated air is supplied from the first aerator 16 into the breeding aquarium 12 through the first air supply pipe 15 at a rate of 8 liters/minute to aerate the breeding seawater in the breeding aquarium 12. Also, since the activated charcoal 17 is located in the breeding aquarium 12, the breeding seawater is maintained in a stable, clean state by the deodorizing action, purifying action, and oxidation suppressing action of the activated charcoal 17. Further, microorganisms inhabiting the activated charcoal 17, such as nitrifying bacteria, decompose excretion and so on in the breeding seawater. Since approximately one liter of water evaporates per day, electrostatically treated replacement water is added.

Subsequently, a feed liquid of chaetoceros and pavlova, which has reached a predetermined culture concentration of 3,000,000 cells/ml by the massive culture, is injected into the feed culture bath 23. Then, two liters of feed liquid are supplied to the breeding aquarium 12 through the fifth circulation pipe 30 four times per day at regular intervals, such that the culture concentration is in a range of 2,000,000 to 3,000,000 cells/ml. Consequently, the pearl oysters 11 grow and feed on the liquid food. At this time, the pearl oysters 11 discharge feces and urine into the breeding seawater, causing the breeding seawater to become turbid.

The breeding seawater is pumped by the first pump 14 in the breeding aquarium 12 through the first circulation pipe 20 and supplied to the biological decomposition bath 19. Consequently, the nitric acid bacteria in the biological decomposition bath 19 carry out biological decomposition for decomposing ammonia contained in the feces and urine of the pearl oysters 11 in the breeding seawater into nitrate to produce decomposition-treated seawater, which reduces the contamination level and turbidity of the breeding seawater.

In this case, since the activated charcoal 17 is located in the biological decomposition bath 19, the biological decomposition bath 19 is cleaned and the biological decomposition is stable. Then, some of the decomposition-treated seawater is returned into the breeding aquarium 12 through the second and third circulation pipes 21, 22. As a result, the breeding seawater within the breeding aquarium 12 is not contaminated or turbid, thus the probability that the pearl oysters 11 will suffer from illness or die is reduced. Also, some of the decomposition-treated seawater is pumped by the second pump 29 through the fourth circulation pipe 28 into the feed culture bath 23.

The chaetoceros and pavlova inhabit the feed culture bath 23. In addition, the feed culture bath 23 is irradiated with light from the fluorescent lamp 24. Thus, the chaetoceros and pavlova produce oxygen by photosynthesis with the light and carbon dioxide. Moreover, since the chaetoceros and pavlova use nitrate in the decomposition-treated seawater as a nutrient source, they grow and proliferate to serve as feed liquid for the pearl oysters 11.

In this event, the feed culture bath 23 is supplied with electrostatically treated air from the second aerator 26, as in the case of the breeding aquarium 12, so that the feed liquid within the feed culture bath 23 is aerated. The culture of the chaetoceros and pavlova is thus stable, and the culturing speed is improved.

Then, the chaetoceros and pavlova are injected into the breeding aquarium 12 four times per day through the fifth circulation pipe 30. Since phytoplankton is included in the feed liquid, the pearl oysters 11 can be raised and bred. The pearl oysters 11 eat the phytoplankton and develop.

Specifically, the breeding seawater in the breeding aquarium 12, the decomposition-treated seawater in the biological decomposition bath 19, and the feed liquid in the feed culture bath 23 are coupled by a food chain. In addition, since liquid circulates through the first to fifth circulation pipes 20, 21, 22, 28, 30, the liquid is not exposed to external factors or generate any waste while they are circulating. It is therefore possible to prevent the pearl oysters 11 from dying or suffering from illness due to external factors such as viruses and pathogenic bacteria, and to breed or culture the pearl oysters 11 in a stable state for a long period.

Also, since the breeding seawater is circulated for reuse, a large supply of seawater is not required. In other words, the pearl oysters 11 can be readily bred without requiring large scale seawater handling facilities.

Further, while the pearl oysters 11 are cultured for 6 to 8 months, a pearl layer is formed on the surface of the core transplanted to the inside of each pearl oyster 11, and a pearl is thus formed.

Advantages provided by the first embodiment are described below.

According to the breeding apparatus 32 of the first embodiment, the breeding aquarium 12, the biological decomposition bath 19, and the feed culture bath 23 are joined through the first to fifth circulation pipes 20, 21, 22, 28, 30, and are linked through a food chain of the pearl oysters 11, the nitrifying bacteria, which use the pearl oyster waste as food (biological decomposition), phytoplankton, which use decomposed substances produced by the biological decomposition as a nutrient source, and the pearl oysters 11, which use the phytoplankton as food. Then, since the breeding seawater is purified during circulation, the breeding seawater does not remain dirty, and the pearl oysters 11 are prevented from dying or suffering from illness. It is therefore possible to breed or culture fish and/or shellfish in a stable manner for a long period. Further, since the breeding seawater is circulated for reuse, no waste is produced, and no large scale facilities are required. In other words, the apparatus involved in the culture is simple and does not require facilities for supplying seawater.

According to the breeding apparatus 32 of the first embodiment, the breeding aquarium 12 and the feed culture bath 23 are supplied with the electrostatically treated air, so that the breeding seawater and the feed liquid is aerated using the electrostatically treated air. For this reason, the breeding seawater in the breeding aquarium 12 remains clean to suppress the generation of pathogenic bacteria and to breed or culture the pearl oysters 11 in a stable state. In addition, the chaetoceros and pavlova in the feed culture bath 23 can be cultured in a stable state, and the culturing speed is improved.

According to the breeding apparatus 32 of the first embodiment, the electrostatically treated water is used to replace water that evaporates from the breeding aquarium 12. For this reason, the breeding seawater in the breeding aquarium 12 remains in a stable state to suppress the generation of pathogenic bacteria or the like and to breed or culture the pearl oysters 11 in a stable state.

According to the breeding apparatus 32 of the first embodiment, activated charcoal 17 is located in the breeding aquarium 12 and the biological decomposition bath 19. Therefore, impurities in the breeding seawater within the breeding aquarium 12 and the decomposition-treated seawater within the biological decomposition bath 19 are adsorbed by the deodorizing action, purifying action, oxidation suppressing action of the activated charcoal 17, making it maintaining a stable state. Further, microorganisms inhabiting the activated charcoal 17, such as nitrifying bacteria, biologically decompose waste products of the pearl oysters 11 in the breeding seawater and decomposition-treated seawater, so that the breeding seawater and the decomposition-treated seawater are clean.

According to the breeding apparatus 32 of the first embodiment, the amount of breeding seawater injected into the breeding aquarium 12 is adjusted to be one and one half to three liters per pearl oyster 11. The pearl oysters 11 thus do not suffocate and are permit to breed or culture in a stable state.

According to the breeding apparatus 32 of the first embodiment, nitrifying bacteria live in the biological decomposition bath 19. The bacteria effect nitration, which decomposes ammonia in feces and urine of the pearl oysters 11 in the breeding seawater into nitrate. This decomposes the feces and urine to naturally purify the dirty breeding seawater. Consequently, stable, decomposition-treated seawater is produced without using chemicals and the breeding cost is reduced.

According to the breeding apparatus 32 of the first embodiment, pearls are formed by breeding or culturing mother pearl oysters 11 for six to eight months after spherical cores are placed in the oysters 11.

According to the breeding apparatus 32 of the first embodiment, minerals that are required to raise the pearl oysters 11 are added to the breeding aquarium 12. It is therefore possible to improve the development of the pearl oysters 11.

In the following, a second embodiment will be described only for those aspects that are differ from the first embodiment. In the second embodiment, a large scale fish and/or shellfish breeding apparatus, i.e., a breeding factory 32, is provided.

As illustrated in FIG. 5, the factory 32 is provided with an artificial seawater production/storage bath 62 for producing and storing artificial seawater for use as breeding seawater. The artificial seawater is produced by dissolving a salt for artificial seawater into electrostatically treated water. MARINE ESSENCE (trademark of Nihon Kateiyo En Kabushiki Kaisha) is used as the salt for artificial seawater. Components of the Marine Essence include calcium, magnesium, potassium, sodium, chlorine, and sodium chloride. When Marine Essence is used, the artificial seawater is adjusted to have a chlorine concentration in a range of 3.0 to 3.4%. The electrostatically treated water is supplied from an electrostatically treated water producing apparatus 31 positioned near the artificial seawater production/storage bath 62. Natural seawater may be used as the breeding seawater.

A first supply pump 63 is located in the artificial seawater production/storage bath 62, and one end of a first pipe 64 is connected to the first supply pump 63. The other end of the first pipe 64 is directed into three breeding aquariums 12, which are positioned near the artificial seawater production/storage bath 62, as illustrated in FIG. 6. Each of the breeding aquariums 12 is formed in a closed box having the capacity of ten tons. From the artificial seawater production/storage bath 62, the breeding seawater is injected into the respective breeding aquariums 12 by the first supply pump 63, and a plurality of cages 13, in which a plurality of pearl oysters 11 are contained, are placed therein, so that the pearl oysters 11 can be bred or cultured within the breeding aquariums 12. The number and capacity of the breeding aquariums 12 may be changed as appropriate in accordance with the amount of the pearl oysters 11 to be cultured.

As illustrated in FIG. 5, a fluorescent lamp 24, which is different from the aforementioned light source, is located above the breeding aquariums 12. The fluorescent lamp 24 illuminates the breeding aquariums 12. Also, calcium, iron and zinc are added to the breeding aquariums 12 as minerals.

A pair of submersible pumps 65 are located at opposing positions in each of the breeding aquariums 12 to serve as a water flow generator. The submersible pumps 65 cause a current in the breeding aquariums 12. Also, in each of the breeding aquariums 12, a water quality tester 66 is located for measuring the quality of the breeding seawater. Based on the result of a measurement by the water quality tester 66, the water quality is managed corresponding to abnormal water quality and so on.

A decomposition layer 67 is further disposed on the bottom of each of the breeding aquariums 12. The decomposition layer 67 is formed of a coral layer 67a, carbon powder layer 67b, a silica sand layer 67c, and a Bakuhanseki-stone layer 67d layered from the top. As the carbon powder, powders of binchotan charcoal are particularly preferred. The carbon powders and the Bakuhanseki-stone purify the breeding seawater. On the silica sand and coral, microorganisms for biologically decomposing contaminating substances, such as excretion and waste materials are fixed. The coral is also suitable for maintaining the calcium concentration in the breeding seawater. The proportions of the respective component layers in the decomposition layer 67 are preferably set to 25 to 30% for the carbon power layer 67b; 35 to 40% for the silica sand layer 67c; 15 to 20% for the Bakuhansekistone layer 67d; and 15 to 20% for the coral layer 67a to ensure that microorganisms are fixed and to purify the breeding seawater through the biological decomposition.

Then, the contaminating substances deposited on the bottom of the breeding aquarium 12 are cleaned by the decomposition layer 67, so that the quality of the breeding seawater is maintained. The laminating order in the decomposition layer 67 and the component proportions may be changed as required.

In addition, a temperature adjuster 67 is located near the breeding aquarium 12, such that the water temperature in the breeding aquarium 12 is adjusted in a range of 13 to 25° C. As illustrated in FIG. 6, a pair of first filters 69 are located at positions above each of the breeding aquariums 12. One end of a second pipe 70 is connected to each of the first filters 69, and the other end is directed into the breeding aquarium 12. The second pipe 70 is connected to a second supply pump 71, such that the breeding seawater is pumped by the second supply pump 71 and supplied to the first filters 69. In addition, one. end of first discharge pipe 72 is connected to each of the first filters 69, and the other end is directed into the breeding aquariums 12.

As illustrated in FIG. 7, a filtering material 73 is located in the first filter 69, and the filtering material 73 is formed of a carbon powder layer 73a, an oyster shell layer 73b, a seed bacteria filtering material layer 73c, a coral (grain) layer 73d, a coral stone layer 73e, an Izukalite-stone layer 73f, a silica sand layer 73g, a ceramic ball layer 73h, and a Bakuhanseki-stone layer 73i laminated from the top. The oyster shell layer 73b, the coral (grain) layer 73d, the coral stone layer 73e, the Izukalite-stone layer 73f and the ceramic ball layer 73h add calcium and minerals to the breeding seawater, and microorganisms for biologically decomposing contaminating substances such as excretion and waste matters are fixed thereon. In place of the oyster shell layer 73b, a layer serving as a calcium source such as surf clam or the like may be used. Powders of binchotan charcoal are particularly preferred as the carbon powder.

The carbon powder and Bakuhanseki-stone also purify the breeding seawater. The seed bacteria filtering material layer 73c is provided for breeding the microorganisms within the filtering material 73, and this layer purifies contaminated substances after the fixation of microorganisms. Some of the breeding seawater supplied into the first filter 69 by the second supply pump 71 is filtered by the filtering material 73 and discharged into the breeding aquarium 12 from the first discharge pipe 72.

At this time, the breeding seawater is purified by the filtering material 73 and supplemented with calcium and minerals. The laminating order of the filtering layers in the filtering material 73 may be changed as required.

As illustrated in FIG. 5, one end of a discharge pipe 74 is connected to the electrostatically treated water producing apparatus 31, the discharge pipe 74 is connected to a supply pump 75, and the other end is directed into the respective breeding aquariums 12. Then, electrostatically treated water is supplied into the breeding aquariums 12 as required.

One end of the third pipe 76 and one end of the second discharge pipe 77 are connected to each of the breeding aquariums 12, and the other end of the second discharge pipe 77 is directed into a breeding seawater storage bath 78 installed in the factory. Then, some of the breeding seawater is discharged into the breeding seawater storage bath 78. The third pipe 76 is connected to a third supply pump 79, and the other end of the third pipe 76 is connected to a biological decomposition bath 19 installed in the factory. In the biological decomposition bath 19, a filtering material 73 similar to that of the first filter 69 is located.

Some of the breeding seawater within the breeding aquarium 12 is supplied into the biological decomposition bath 19 by the third supply pump 79. Also, in the breeding seawater storage bath 78, a fourth supply pump 81 is located, and one end of the fourth pipe 82 is connected to the fourth supply pump 81. The other end of the fourth pipe 82 is connected to the third pipe 76. Some of the breeding seawater within the breeding seawater storage bath 78 is supplied to the biological decomposition bath 19 by the fourth supply pump 81.

One end of a third discharge pipe 83 and one end of a fourth discharge pipe 84 are connected to the lower end of the biological decomposition bath 19. The other end of the third discharging pipe 83 is connected to the temperature adjuster 68 and is also directed into the breeding aquarium 12. The other end of the fourth discharge pipe 84 is directed into a decomposition-treated seawater storage bath 85 installed in the factory. Some of the breeding seawater supplied into the biological decomposition bath 19 is filtered by the filtering material 73, and excretion of the pearl oysters 11 and waste matters are decomposed by microorganisms such as bacteria capable of effecting nitration, which inhabit the carbon powder layer 73a, thereby producing decomposition-treated seawater. Some of the decomposition-treated seawater is supplied from the third discharge pipe 83 to the temperature adjuster 68 and is adjusted to a water temperature appropriate for breeding the pearl oysters 11 by the temperature adjuster 68. The seawater is then discharged into the breeding aquarium 12.

Some of the decomposition-treated seawater is discharged from the fourth discharge pipe 84 into the decomposition-treated seawater storage bath 85. In the decomposition-treated seawater storage bath 85, a fifth supply pump 86 is located, and one end of a fifth pipe 87 is connected to the fifth supply pump 86. The other end of the fifth pipe 87 is connected to the biological decomposition bath 19. The decomposition-treated seawater within the decomposition-treated seawater storage bath 85 is returned to the biological decomposition bath 19 by the fifth supply pump 86.

In the decomposition-treated seawater storage bath 85, a sixth supply pump 88 is located, and one end of the sixth pipe 89 is connected to the sixth supply pump 88. The other end of the sixth pipe 89 is connected to a decomposition-treated seawater filter 90 installed in the factory. The decomposition-treated seawater filter 90 is provided with a filtering material 73 similar in structure to the first filter 69. Then, some of the decomposition-treated seawater within the decomposition-treated seawater storage bath 85 is supplied to the decomposition-treated seawater filter 90 by the sixth supply pump 88.

One end of a fifth discharge pipe 91 and one end of a seventh pipe 92 are connected to the lower end of the decomposition-treated seawater filter 90. The other end of the fifth discharge pipe 91 is directed into the decomposition-treated seawater storage bath 85. Then, some of the decomposition-treated seawater produced by the decomposition-treated seawater filter 90 is discharged from the fifth discharge pipe 91 into the decomposition-treated seawater storage bath 85.

The other end of the seventh pipe 92 is connected to a seventh supply pump 93 and branches into a plurality of pipes, which are connected to a plurality of feed culture baths 23 installed in the factory. Some of the decomposition-treated seawater supplied from the biological decomposition bath 19 is supplied into the feed culture baths 23 through biological decomposition by the decomposition-treated seawater filter 90. As illustrated in FIG. 8, each of the feed culture baths 23 is formed of a clear synthetic resin material into a closed cylinder, and has the capacity of 200 to 300 liters. The capacity and number of the feed culture baths 23 may be changed appropriately according to the amount of phytoplankton to be cultured.

A plurality of feed stock culture baths 94 are installed near the feed culture baths 23, and chaetoceros and pavlova, which have undergone stock culture and intermediate culture, are massively cultured in the feed stock culture baths 94. A fluorescent lamp 24 is located immediately adjacent to each of the feed stock culture baths 94. In place of the fluorescent lamp 24, sunlight may be used. One end of an eighth pipe 95 is connected to the lower end of each of the feed stock culture baths 94, and the other end of the eighth pipe 95 is connected to an eighth supply pump 96.

The chaetoceros and pavlova, which have been cultured to a predetermined concentration in the feed stock culture bath 94, are pumped by the eighth supply pump 96 and appropriately supplied to the respective feed culture baths 23 from the eighth pipe 95. In each of the feed culture baths 23, decomposition-treated seawater, chaetoceros and pavlova are supplied from the decomposition-treated seawater filter 90. Then, the feed liquid is adjusted by culturing and proliferating the chaetoceros and pavlova, which use nitrate in the decomposition-treated seawater as a nutrient source. One end of a sixth discharge pipe 97 is connected to the lower end of each of the feed culture baths 23, and the other ends are collectively connected to a feed storage bath 98.

Then, each of the feed culture baths 23 is supplied with the decomposition-treated seawater to cause the feed liquid to overflow, so that the feed liquid is collected into the feed storage bath 98 and stored. A stirrer 99 is located in the feed storage bath 98, so that the feed liquid is stirred by the stirrer 99 for uniform distribution. One end of a ninth pipe 100 is connected to the lower end of the feed storage bath 98, and the other end is connected to a feed measuring pot 102 through a ninth supply pump 101. Then, the feed liquid is supplied into the feed measuring pot 102 by the ninth supply pump 101.

One end of a seventh discharge pipe 103 is connected to the feed measuring pot 102, and the other end is directed into the breeding aquarium 12. Then, the feed liquid in the feed culture bath 23 is periodically supplied to the breeding aquarium 12 in the fixed amount through the feed storage bath 98 and the feed measuring pot 102. The amount of supplied feed liquid and supply intervals are changed appropriately depending on the breeding conditions of the pearl oysters 11.

Since an aerator 104 connected to the electrostatically treated air generator 27 is directed into the breeding aquarium 12, the artificial seawater production/storage bath 62, the breeding seawater storage bath 78, the biological decomposition bath 19, the decomposition-treated seawater storage bath 85, and the feed culture bath 23, electrostatically treated air can be discharged into the respective baths. Thus, the liquids within the respective baths can be aerated.

Now, a description follows of a method of breeding the pearl oysters 11 using the breeding apparatus 32, i.e., a culturing method.

First, artificial seawater is injected from the artificial seawater production/storage bath 62 into the breeding aquariums 12, and a plurality of cages 13, in which a plurality of mother shellfish, i.e., pearl oysters 11 are contained, are placed therein. The water temperature in the breeding aquariums 12 is adjusted by the temperature adjuster 68 to a range of 13 to 25° C. For example, the water temperature is adjusted in a range of 20 to 24° C. to activate and stabilize physiological activities of the pearl oysters 11, whereas the water temperature is adjusted in a range of 13 to 20° C. to suppress the physiological activities of the pearl oysters 11. Spherical cores have been transplanted inside of the pearl oysters 11. In addition, the fluorescent lamp 24 above the breeding aquarium 12 is turned on and off to simulate the cycle of day and night to adjust the growth of the pearl oysters 11.

Subsequently, the feed liquid is supplied from the feed measuring pot 102 into the respective breeding aquariums 12. Thus, the pearl oysters 11 develop and use the feed liquid as food. At this time, the pearl oysters 11 discharge feces and urine into the breeding seawater, and the breeding seawater becomes turbid. Excretions and wastes in the breeding aquarium 12 are decomposed by nitrifying bacteria in the decomposing layer 67 within the breeding aquarium 12, thereby cleaning the breeding seawater. Approximately 1.6 to 2% of water is decreased per day by evaporation from the breeding aquarium 12. For this reason, an amount of electrostatically treated water corresponding to the decreased amount is replaced.

A pair of submersible pumps 65 cause current flow in the breeding aquarium 12 at a rate of 5 to 20 cm/sec. For promoting metabolic activities of the pearl oysters 11, the flow rate is preferably in a range of 10 to 20 cm/sec. This water flow causes the inside of the breeding aquarium 12 to be closer to the conditions in the sea, so that the growth of the pearl oysters 11 is activated. Also, since the feed liquid supplied into the breeding aquarium 12 is stirred, the feed liquid is uniformly distributed in the breeding aquarium 12 to uniformly supply the pearl oysters 11 with the feed. In addition, the breeding seawater within the breeding aquarium 12 can be efficiently delivered to the first filter 69. The quality of the breeding seawater is managed by the water quality tester 66.

Next, some of the breeding seawater in the breeding aquarium 12 is pumped by the second supply pump 71 and supplied to the first filter 69. Consequently, excretion and waste in the breeding seawater is purified while it passes through the filtering material 73. Also, calcium and minerals are added to the breeding seawater. Furthermore, the filtering material 73 is formed using materials that grow in the sea and in a plurality of layers, and a variety of microorganisms are fixed to the layered materials. Therefore, as the breeding seawater passes through the filtering material 73, it becomes nearly the same as natural seawater. Further, the breeding seawater is retained in the first filter 69, and the breeding seawater passing through the filtering material 73 is not mixed with the breeding seawater before passing through the filtering material 73, and is discharged into the breeding aquarium 12 from the first discharge pipe 72 of the first filter 69. Thus, the quality of the breeding seawater in the breeding aquarium 12 is maintained in a clean state through the management of the water quality by the water quality meter 66 and the first filter 69.

Next, some of the breeding seawater is discharged from the second discharge pipe 77 of the breeding aquarium 12 to the breeding seawater storage bath 78. Simultaneously, some of the breeding seawater in the breeding aquarium 12 is supplied into the biological decomposition bath 19 by the third supply pump 79. Then, for adjusting the amount of breeding seawater within the biological decomposition bath 19, breeding seawater in the breeding seawater storage bath 78 is supplied to the biological decomposition bath 19 by the fourth supply pump 81 as required.

Some of the breeding seawater supplied into the biological decomposition bath 19 passes through the filtering material 73, and is biologically decomposed to produce decomposition-treated seawater. Likewise, in this case, since the biological decomposition bath 19 is provided with filtering material 73, which is similar to that of the first filter 69, the quality of the decomposition-treated seawater is maintained, and the seawater supplemented with calcium and other minerals by the filtering material 73. Some of the decomposition-treated seawater is supplied from the third discharge pipe 83 to the temperature adjuster 68, which adjusts the water temperature to be appropriate for the breeding of the pearl oysters 11. Then, the seawater is discharged into the breeding aquarium 12.

Further, some of the decomposition-treated seawater is discharged from the fourth discharge pipe 84 into the decomposition-treated seawater storage bath 85. Then, some of the decomposition-treated seawater in the decomposition-treated seawater storage bath 85 is returned to the biological decomposition bath 19 by the fifth supply pump 86 and is supplied to the decomposition-treated seawater filter 90 by the sixth supply pump 88.

Subsequently, some of the decomposition-treated seawater supplied into the decomposition-treated seawater filter 90 passes through the filtering material 73 and is biologically decomposed to again produce decomposition-treated seawater. Since the decomposition-treated seawater filter 90 is provided with filtering material 73 similar to that of the first filter 69, the quality of the decomposition-treated seawater is maintained, and the seawater is supplemented with calcium and other minerals by the filtering material 73. Some of the decomposition-treated seawater is discharged from the fifth discharge pipe 91 into the decomposition-treated seawater storage bath 85. Further, the decomposition-treated seawater is supplied into the feed culture bath 23 by the seventh supply pump 93. Then, the breeding seawater is converted into decomposition-treated seawater, which has low contamination and turbidity, through three treatments of the biological decomposition process. Then, the treated seawater is supplied to the feed culture bath 23. Also, the breeding seawater that is returned to the breeding aquarium 12 is returned in a clean state and is supplemented with calcium and other minerals.

The feed culture baths 23 are supplied with chaetoceros and pavlova, which have been cultured to a predetermined concentration in the feed stock culture bath 94, by the eighth supply pump 96. The feed culture baths 23 are also supplied with decomposition-treated seawater. Further, the respective feed culture baths 23 are irradiated with sunlight. A fluorescent lamp 24 may be provided, as indicated by two-dot chain lines in FIG. 1, such that the fluorescent lamp 24 is illuminated when the amount of sunshine is low, during a rainy season or the like. The chaetoceros and pavlova produce oxygen by photosynthesis with the light and carbon dioxide. In addition, since the chaetoceros and pavlova use nitrate in the decomposition-treated seawater as a nutrient source, they can grow and proliferate, and the feed liquid can be cultured by them.

Subsequently, the feed liquids overflowing from the respective feed culture baths 23 are collected into the feed storage bath 98 and stored, and the feed liquid is uniformly distributed by the stirrer 99 in the feed storage bath 98. The feed liquid is supplied from the feed storage bath 98 to the feed measuring pot 102 by the ninth supply pump 101, and the feed liquid is periodically supplied in fixed amounts into the breeding aquariums 12 from the feed measuring pot 102.

Consequently, the pearl oysters 11 feed on the chaetoceros and pavlova, so that the pearl oysters 11 develop.

According to the second embodiment, the following advantages are provided.

The breeding aquariums 12, the breeding seawater storage bath 78, the biological decomposition bath 19, the decomposition-treated seawater storage bath 85, the decomposition-treated seawater filter 90, the feed culture baths 23, and the breeding aquariums 12 are coupled through a plurality of pipes, and the breeding seawater, the decomposition-treated seawater, and the feed liquid are circulated among them. Also, these parts are linked through the food chain of the pearl oysters 11, the nitrifying bacteria that use feces and urine of the pearl oysters 11 as feed (biological decomposition), phytoplankton using decomposed and treated substances by the biological decomposition as a nutrient source, and the pearl oysters 11 using the phytoplankton as feed. It is therefore possible to culture the pearl oysters 11 within a closed factory on land with reduced waste discharged from the factory.

Additionally, in conventional pearl oyster culturing i.e., pearl culturing, cores are transplanted into the pearl oysters 11, and thereafter the pearl oysters 11 are cultured in a culture raft or the like installed in the sea. The feed for such pearl oysters 11 is plankton, which naturally proliferates and lives in the sea. Thus, the pearl oysters 11 are also cultured within the sea, and the pearl culturing has been the primary industries largely affected by environmental factors such as oceanic environmental characteristics, weather, variations in the sea circumstance, disease, and injurious insects.

However, in the second embodiment, the pearl oysters 11 are cultured in the breeding aquariums 12 within the land-based factory, and the pearl oysters 11 are supplied with living feed (chaetoceros and pavlova). For this reason, it is possible to culture the pearl oysters 11 and conduct high-level production management for the pearl oysters 11 in a stable manner without depending on external factors such as the sea conditions and environmental factors. Thus, culturing pearl oysters 11 can be operated as a secondary industries.

In the breeding apparatus 32, that which is artificially supplied from the outside includes only light, the filtering material 73, nutrient salt and salt for artificial seawater during the stock culture and intermediate culture, so that the production costs are low in the culture.

The temperature of the breeding seawater in the breeding aquariums 12 can be adjusted. It is therefore possible to adjust the physiological activities of the pearl oysters 11 and efficiently raise the pearl oysters 11.

Since the coral layer 67a and oyster shell layer 73b are included in the decomposition layer 67 and the filtering material 73, minerals required to raise the pearl oysters 11 can be automatically supplemented.

When the first filter 69, the biological decomposition bath 19 and the decomposition-treated seawater filter 90 are stopped, the breeding seawater can be biologically decomposed by the decomposition layer 67 within the breeding aquarium 12.

The conditions inside the breeding aquarium 12 can be made nearly the same as oceanic conditions by the pair of the submersible pumps 65, so that the growth of the pearl oysters 11 can be activated. Also, the feed liquid can be uniformly distributed to uniformly supply all the pearl oysters 11 with food. In addition, the breeding seawater within the breeding aquarium 12 can be efficiently delivered to the first filter 69 to efficiently carry out the biological decomposition of the breeding seawater and effectively maintain the water quality.

Since the water quality tester 66 is located in the breeding aquarium 12, the quality of the breeding seawater can be measured to maintain the water quality.

The temperature of some of decomposition-treated seawater from the biological decomposition bath 19 is adjusted by the temperature adjuster 68 to be appropriate for the growth of the pearl oysters 11. It is therefore possible to adjust the physiological activities of the pearl oysters 11 to create a stable culture.

The breeding seawater is biologically decomposed three times in the first filter 69, the biological decomposition bath 19 and the decomposition-treated seawater filter 90 to produce decomposition-treated seawater, which has a low contamination and turbidity. It is therefore possible to prevent contamination of the feed culture bath 23 and to have a stable culture of chaetoceros and pavlova. Also, the breeding seawater returned to the breeding aquarium 12 can be cleaned to produce a stable culture of the pearl oysters 11.

Since the fluorescent lamp 24 is located above the breeding aquarium 12, day and night can be simulated by the fluorescent lamp 24 to adjust the growth of the pearl oysters 11.

The respective embodiments may be modified in the following manner.

In the respective embodiments, the breeding aquarium 12 may be used to raise abalone, flatfish, oyster, scallop, prawn, or the like, in which case, microorganisms in the biological decomposition bath 19, plankton in the feed culture bath 23, environment in the breeding aquarium 12, and so on may be changed to adapt to their particular environment. In this case, the fish and/or shellfish are stably cultured for a long period.

In the first embodiment, sunlight may be irradiated to the feed culture bath 23 without using an artificial light source such as the fluorescent lamp 24. Also, artificial light and sunlight may be used in combination such that the sunlight is used in the daytime and artificial light such as the fluorescent lamp 24 is used during the night. In this case, the chaetoceros and pavlova in the feed culture bath 23 can grow as they use decomposed components of feces and urine as food, and carry out photosynthesis with sunlight and carbon dioxide.

In the respective embodiments, only one of chaetoceros and pavlova may be cultured as food for the pearl oysters 11. In this case, the pearl oysters 11 can also be bred.

In the respective embodiments, the supply of electrostatically treated air may be omitted for at least one of the breeding aquarium 12, the artificial seawater production/storage bath 62, the breeding seawater storage bath 78, the biological decomposition bath 19, the decomposition-treated seawater storage bath 85 and the feed culture bath 23. In this case, the pearl oysters 11 can be bred in the breeding aquarium 12, and chaetoceros and pavlova can be cultured in the feed culture bath 23.

In the first embodiment, the activated charcoal 17 may be omitted in the breeding aquarium 12 and the biological decomposition bath 19. Alternatively, the activated charcoal 17 may be disposed in one of the breeding aquarium 12 and the biological decomposition bath 19. In this case, the breeding seawater can be biologically decomposed in the biological decomposition bath 19.

In the respective embodiments, the electrostatically treated water supplied to the breeding aquarium 12 may be replaced with sterilized water without undergoing the electrostatic field treatment. In this case, water can be added to the breeding aquarium 12 to compensate for evaporation.

In the first embodiment, the decomposition layer 67 may be disposed in the breeding aquarium 12.

In the second embodiment, a stirrer may be used as a current generator in the breeding aquarium 12. Alternatively, current flow may be manually generated.

In the first embodiment, the breeding aquarium 12 may be provided with the first filter 69, and the decomposition-treated seawater filter 90 may be positioned between the biological decomposition bath 19 and the feed culture bath 23. Alternatively, only one of the filter 69 and the decomposition-treated seawater filter 90 may be used. In this case, the breeding seawater may be biologically decomposed a larger number of times to clean the decomposition-treated seawater.

In the second embodiment, one of the first filter 69 and the decomposition-treated seawater filter 90 may be omitted.

In the respective embodiments, the breeding apparatus 32 may be used to breed young pearl oysters 11 for two to three years to raise mother shellfish.

In the first embodiment, another fluorescent lamp 24 may be located above the breeding aquarium 12 to irradiate the breeding aquarium 12 with light.

In the first embodiment, the submersible pumps 65 may be located in the breeding aquarium 12 to generate a current in the breeding seawater. In this case, the inside of the breeding aquarium 12 can also be made nearly the same as the ocean to activate the growth of the pearl oysters 11. In addition, the feed liquid can be uniformly distributed to uniformly supply all the pearl oysters 11 with the feed.

What is claimed is:

1. An apparatus for breeding fish or shellfish comprising:
   an aquarium for containing the fish or shellfish and water;
   a decomposition treating bath for decomposing waste materials from the fish or shellfish, wherein water from the aquarium flows to the decomposition treating bath, and the decomposition treating bath treats the water; and
   a feed culture bath for culturing feed for the fish or shellfish, wherein treated water from the decomposition bath is supplied to the feed culture bath.

2. The breeding apparatus according to claim 1, further comprising an aerator for aerating the water in the aquarium, wherein the aerator electrostatically treats air with an electrostatic field, and the aerator aerates the water in the aquarium with the electrostatically treated air.

3. The breeding apparatus according to claim 1, further comprising an aerator for aerating the water in the feed culture bath, wherein the aerator electrostatically treats air with an electrostatic field, and the aerator aerates the water in the feed culture bath with the electrostatically treated air.

4. The breeding apparatus according to claim 1, wherein carbon is located in the aquarium and the feed culture bath.

5. The breeding apparatus according to claim 4, wherein the carbon is activated charcoal.

6. The breeding apparatus according to claim 5, wherein the activated charcoal includes binchotan charcoal.

7. The breeding apparatus according to claim 1, further comprising a pipe extending between the aquarium and the decomposition bath, a pipe extending between the decomposition bath and the feed culture bath, and a pipe extending between the feed culture bath and the aquarium, wherein water is circulated through the pipes from the aquarium to the decomposition bath and from the decomposition bath to the feed culture bath and from the feed culture bath to the aquarium.

8. The breeding apparatus according, to claim 1, further comprising a water circulation path extending, from the aquarium to the decomposition bath and from the decomposition bath to the feed culture bath and from the feed culture bath to the aquarium, wherein water circulates along, the path.

9. The breeding apparatus according to claim 1, further comprising a filter for filtering the water in the aquarium.

10. The breeding apparatus according to claim 1, further comprising nitrifying bacteria located in the decomposition treating bath, wherein the nitrifying bacteria decompose ammonia, which is included in the waste of the fish or shellfish, to nitrate.

11. The breeding apparatus according to claim 1, wherein the feed includes phytoplankton, which use nitrate as a nutrient source.

12. The breeding apparatus according to claim 1, wherein the aquarium includes a water flow generator for generating a current.

13. The breeding apparatus according to claim 1, further comprising an artificial light source for illuminating the feed culture bath.

14. The breeding apparatus according to claim 1, wherein the aquarium include a decomposition layer, for improving the quality of the water in the aquarium.

15. A method of raising fish or shellfish comprising the steps of:
- providing an aquarium for containing the fish or shellfish and water;
- providing a decomposition treating bath;
- conveying the water from the aquarium to the decomposition treating bath, wherein the decomposition treating bath treats the water from the aquarium;
- providing a feed culture bath for culturing feed for the fish or shellfish;
- conveying water from the decomposition treating bath to the feed culture bath; and
- supplying water that includes feed from the feed culture bath to the aquarium.

16. The method of raising fish or shellfish according to claim 15, further comprising adding electrostatically treated water to the aquarium to compensate for evaporation.

17. The method of raising fish or shellfish according to claim 15, further comprising the step of forming a food chain wherein the decomposition treating bath is supplied with nutrients from the aquarium and the feed culture bath is supplied with nutrients from the decomposition treating bath and the aquarium is supplied with nutrients from the feed culture bath.

18. The method of raising fish or shellfish according to claim 15, further comprising the step of treating waste from the fish or shellfish in the decomposition treating bath and treating waste from the decomposition treating bath in the feed culture bath.

19. The method of raising fish or shellfish according to claim 15, further comprising the step of adding minerals to the aquarium for the fish or shellfish to consume.

20. The method of raising fish or shellfish according to claim 15, further comprising the step of illuminating the feed culture bath.

21. The method of raising fish or shellfish according to claim 15, further comprising the step of culturing bacteria in the decomposition treating bath such that the bacteria decompose waste from the fish or shellfish.

22. The method of raising fish or shellfish according to claim 15, further comprising the step of treating air with an electrostatic field, and aerating the water in the aquarium with the electrostatically treated air.

23. The method of raising fish or shellfish according to claim 15, further comprising the step of treating air with an electrostatic field, and aerating the water in the feed culture bath with the electrostatically treated air.

24. The method of raising fish or shellfish according to claim 15, further comprising the step of forming a circulation path from the aquarium to the decomposition treating bath and from the decomposition treating bath to the feed culture bath and from the feed culture bath to the aquarium and circulating water along the path.

25. The method of raising fish or shellfish according to claim 15, further comprising the step of culturing phytoplankton in the feed culture bath.

* * * * *

UNITED STATES PATENT AND TRADEMARK OFFICE
CERTIFICATE OF CORRECTION

PATENT NO.    : 6,357,392 B1
DATED         : March 19, 2002
INVENTOR(S)   : Katsutomi Ido It is certified that error appears in the above-identified patent and that said Letters Patent is hereby corrected as shown below:

<u>Title page,</u>
Item [30], Foreign Application Priority Data, delete the serial number "10-273612" and insert serial number -- 10-372621. --

Signed and Sealed this

Twenty-fourth Day of September, 2002

Attest:

Attesting Officer

JAMES E. ROGAN
*Director of the United States Patent and Trademark Office*